UNITED STATES PATENT OFFICE.

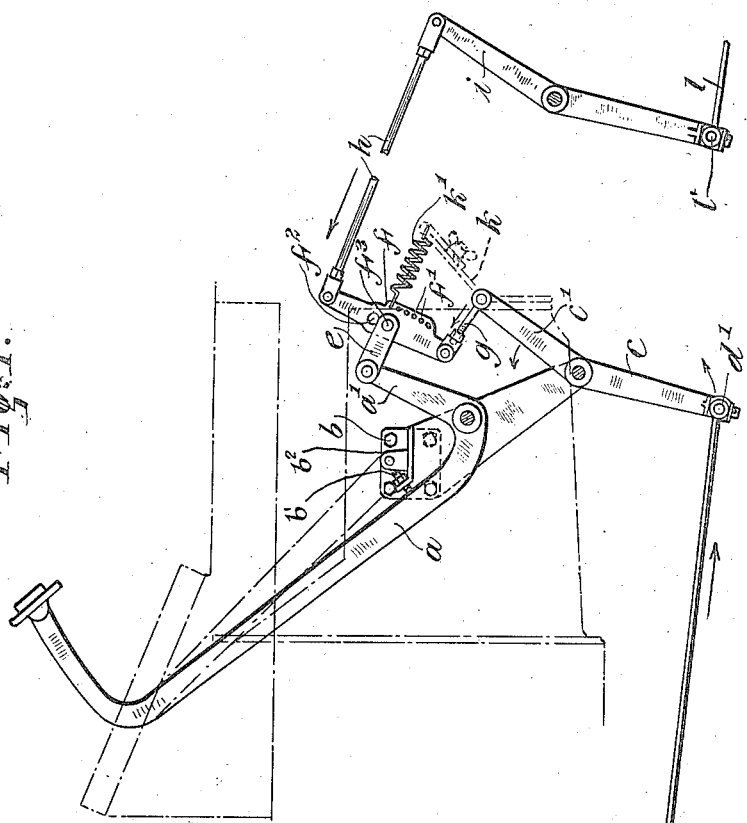
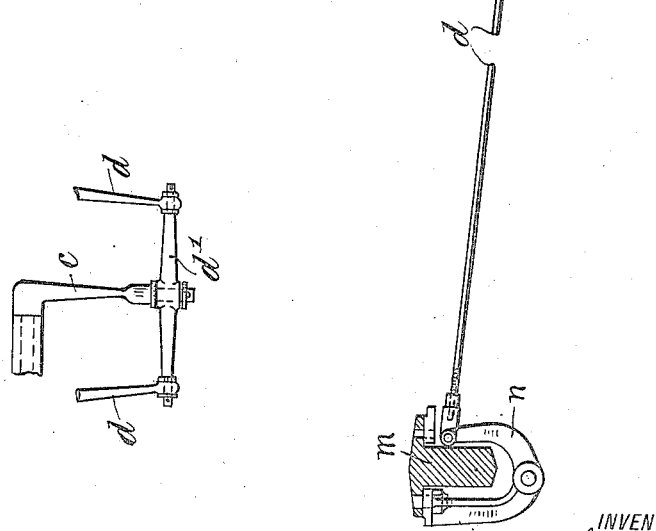

ALEXANDER LUCAND, OF NEW YORK, N. Y., ASSIGNOR TO INTERNATIONAL MOTOR COMPANY, OF NEW YORK, N. Y., A CORPORATION OF DELAWARE.

FOUR-WHEEL-BRAKE EQUALIZER.

1,396,965.           Specification of Letters Patent.      Patented Nov. 15, 1921.

Application filed March 11, 1920. Serial No. 364,887.

*To all whom it may concern:*

Be it known that I, ALEXANDER LUCAND, a citizen of the United States, residing in the borough of Manhattan, of the city of New York, in the State of New York, have invented certain new and useful Improvements in Four-Wheel-Brake Equalizers, of which the following is a specification, reference being had to the accompanying drawing, forming a part hereof.

In an application filed by the present applicant on March 10th, 1920, Ser. No. 364,809, there are shown and described devices for equalizing the braking efforts as to each of two pairs of wheels of a four-wheel vehicle and the braking efforts as between each of the two wheels of a pair. In motor vehicle practice, it will be appreciated that the center of mass of the moving vehicle is so disposed with relation to the front and rear wheels as to make it desirable to apply the braking effort to the rear of the center of mass before it is applied in front of the center of mass. When the braking effort is applied to the front wheels before or simultaneously with the application of the brakes on the rear wheels it has been found that the inertia of the vehicle is such as to tend to swing the load about the dragging front wheels and thereby cause skidding. By the present equalizing devices it is sought to effect what may be termed alternative braking in the sense that by proper adjustment of the devices the same or a greater braking effort may be applied to the two rear wheels of a vehicle simultaneously with or before the application of the braking effort to the front wheels. When the braking effort is applied to the rear wheels first and is greater than the braking effort applied to the front wheels the movement of the vehicle is retarded in the most effective and uniform manner and following such appreciable retarding effort, the front wheels may have braking efforts applied thereto to bring the vehicle to rest. Not only do the improved devices provide for the differential described in point of effort and time but they also provide for an equalizing of the braking effort as between the two wheels of a pair. The invention will be described in detail in connection with the accompanying drawing in which—

Figure 1 is a view, somewhat conventional and in side elevation, of the braking and equalizing devices as applied to the front and rear wheels in accordance with the present invention.

Fig. 2 is a fragmentary view in detail showing the means for equalizing the braking efforts as applied to two of the wheels of a pair.

The brake pedal $a$ is pivoted on a bracket $b$ on which is also pivoted an operating lever $c$ for the brake rods $d$ of, say, the front wheels. Movement of the pedal is limited by the screw $b'$ on the flange $b^2$ of the bracket. The lower end of the operating arm $c$ has pivoted thereto an equalizer bar $d'$ to the ends of which are pivoted the brake rods $d, d$. On the short arm $a'$ of the brake lever is pivoted a link $e$ which, in turn, is pivotally connected to an equalizing bar $f$ whereby the braking efforts between the front and rear wheels are equalized, or, as will be described, are given any differential relation. One end of the equalizer bar $f$ is connected through a link $g$ with one arm $c'$ of the actuating lever $c$ for the front brake rods $d$. The other end of the equalizer bar $f$ is pivotally connected to a brake rod $h$ which is pivoted to an actuating lever $i$ for the brakes of the rear wheels. The lower end of the lever $i$ has pivoted thereto an equalizer bar $l'$, corresponding to the bar $d'$, to the ends of which are pivoted the brake rods $l$, one of which is shown, for the rear wheels. Movement of the equalizer bar $f$ is opposed by means of a suitable spring $k'$ anchored to any fixed portion of the vehicle frame, such as is indicated by a plate $k$, and engaged in any one of a series of holes $f'$ formed along one edge of the equalizer bar $f$. In the preferred construction, the equalizer bar $f$ may have two or more holes $f^2$ therein to receive the pin $f^3$ by means of which the link $e$ is pivotally attached thereto.

In the equalizing devices described it will be substantially true that when the pivot pin $f^3$ is at about the mid point of the equalizer bar $f$ and the spring $k'$ is in line with the line of pull on the link $e$, the braking efforts between the front and rear wheels will be equalized. As pointed out hereinbefore, however, it has been found that where braking effort is applied to each of the four wheels of a vehicle simultaneously and certainly when any braking effort is applied to the front wheels before it is applied to the rear wheels the inertia of the vehicle tends to swing the vehicle about the dragging front wheels and cause skidding. By the proposed devices the braking effort will be applied behind the center of mass, of the vehicle, that is, to the rear wheels before it is applied to the front wheels and if desired, a greater dragging effort may be applied to the rear wheels than to the front wheels giving a differential selection of both time and effort. This is accomplished in either one of two ways, or by employing both of the means shown in the drawing. If the spring $k'$ has its end engaged with one of the holes $f'$ at one side of the line of pitch of the link $e$ on the pull $f^3$, it is evident that movement of the equalizer bar $f$ on the same side of the bar will be materially retarded. As shown a series of holes $f'$ are provided along the edge of the equalizer bar and these holes are, for the most part, on the side of the link $e$ toward the pull link $g$ for the front wheel brakes. Accordingly, the spring $k'$ may be hooked to the equalizer bar $f$ so as to oppose the application of the braking effort to the front wheels to any desired extent. This effect will naturally cause quicker and greater braking efforts to be transmitted to the rear wheels. Their application is less retarded than the application to the front wheels. While a convenient means for effecting this differential application of the rear and front wheel brakes has been shown, it will be understood that the retarding effect of the spring $k'$ on the application to the front wheels might be achieved by interposing the spring $k'$ operatively in the front wheel connections at some other point between the pedal arm $a'$ and the rods $d$.

The other means shown for securing such differential application comprise the holes $f^2$ in the equalizer bar whereby the point of pivotal connection between the bar $f$ and the link $e$ may be changed at will to increase or decrease the relative lengths of the lever arms to which the front and rear brake operating devices are connected. The effect of changing these lever arms is, of course, to change the relative moments with results which will be obvious.

In operation, pressure of the foot on the pedal imparts a pull on the link $e$, which is connected to the equalizer bar at any predetermined point. The force applied to the equalizer bar moves the brake rods $d$ and $h$ in the direction indicated by the arrows, and thus the braking effort is applied to the wheels.

The devices described will be effective for bringing about the alternative application of the brakes in a four wheel vehicle, as desired. The relative time of application of the brakes, to the front wheels will be a matter for determination by the operator as will be the desirable relative amounts of such braking efforts. By devices of the character described or equivalent devices the differential in point of time and amount of braking effort may be readily fixed by the operator and yet the desired degree of equalization is secured.

I claim as my invention:

1. In combination with brake operating devices for the front and rear wheels of a vehicle, means to equalize the braking efforts therebetween including an equalizer bar and connections between said bar and said brake operating devices for the respective pairs of wheels, a pull link pivoted to said equalizer bar intermediate its ends, and spring means adjustably connected to the equalizer bar at one side of the line of pull of said link to differentiate the braking efforts transmitted to the respective pairs of wheels.

2. Brake operating devices for four wheels, comprising an operating lever for the front wheels, an equalizer bar carried pivotally with said operating lever, brake rods for the front wheels pivotally attached to the ends of said equalizer bar, a brake operating rod for the rear wheels, an equalizer bar connected operatively at its ends to said operating lever for the front wheel brakes and to the operating rod for the rear brakes, a pull link for said last named equalizer bar pivoted thereto intermediate its ends, and a spring engageable with said equalizer bar in any desired relation to the line of pull of the link to differentiate the braking efforts transmitted to the respective pairs of wheels.

3. Brake operating devices for four wheels, comprising an operating lever for the front wheels, an equalizer bar carried pivotally with said operating lever, brake rods for the front wheels pivotally attached to the ends of said equalizer bar, a brake operating rod for the rear wheels, an equalizer bar connected operatively at its ends to said operating lever for the front wheel brakes and to the operating rod for the rear brakes, a pull link for said last named equalizer bar connected adjustably thereto at any desired point with respect to its mid section and a spring engageable with said equalizer bar in any desired relation to the line of pull of the link to differentiate the braking efforts transmitted to the respective pairs of wheels.

This specification signed this 28th day of February, A. D. 1920.

ALEXANDER LUCAND.